Dec. 25, 1962     B. C. MATHEWS     3,070,002
APPARATUS AND METHOD FOR PELLETIZING HAY OR THE LIKE
Filed Dec. 2, 1959     6 Sheets-Sheet 1
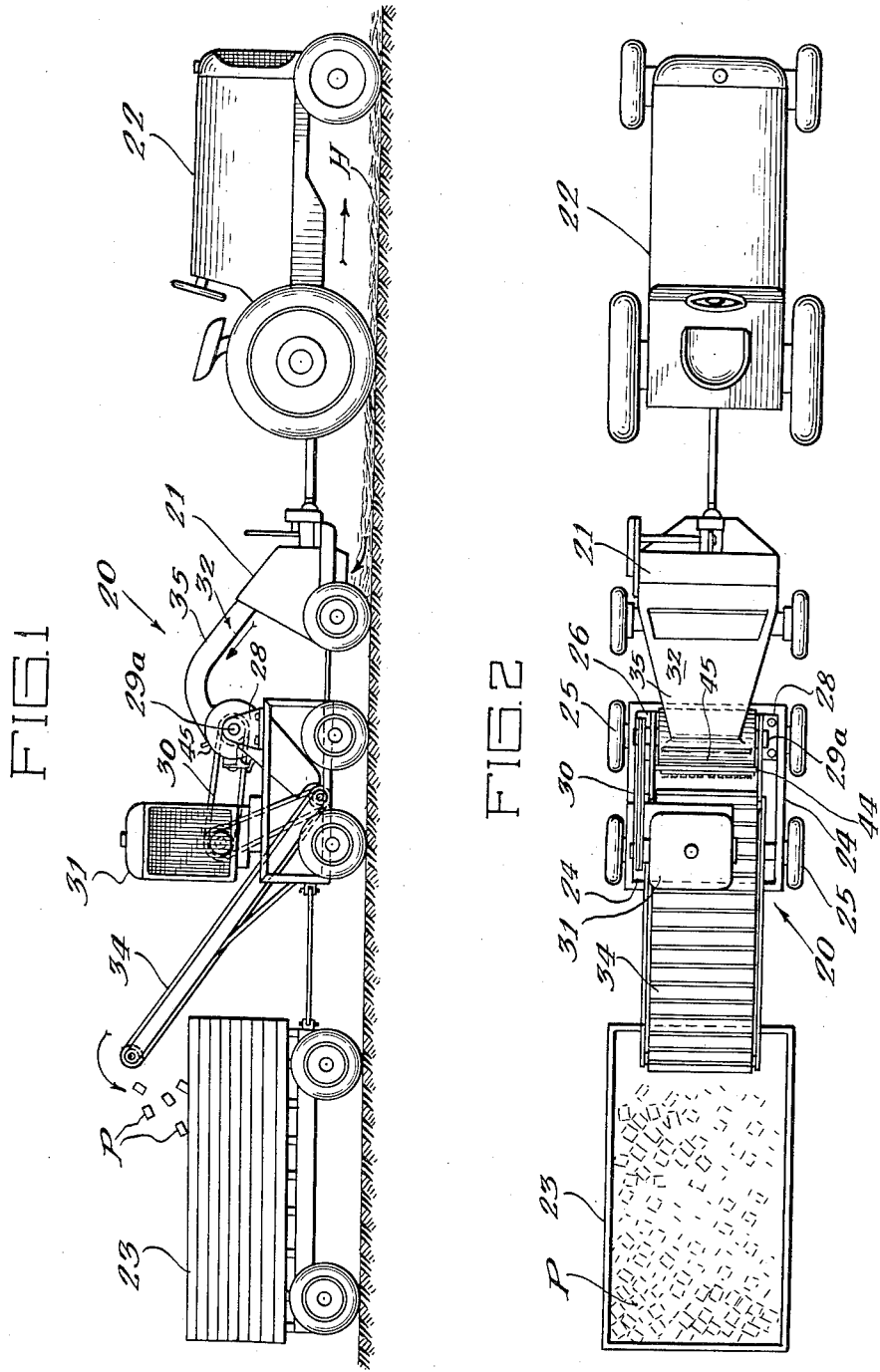
Inventor:
Bernard C. Mathews
By: Zabel, Baker, York,
Jones & Dithmar
Attorneys

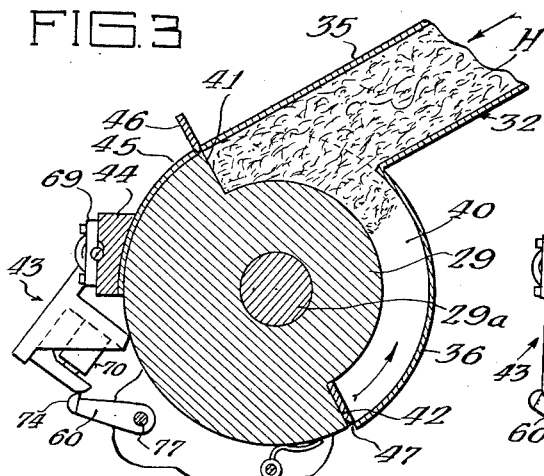
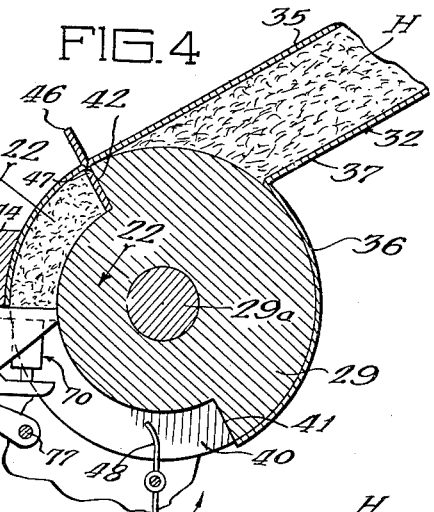
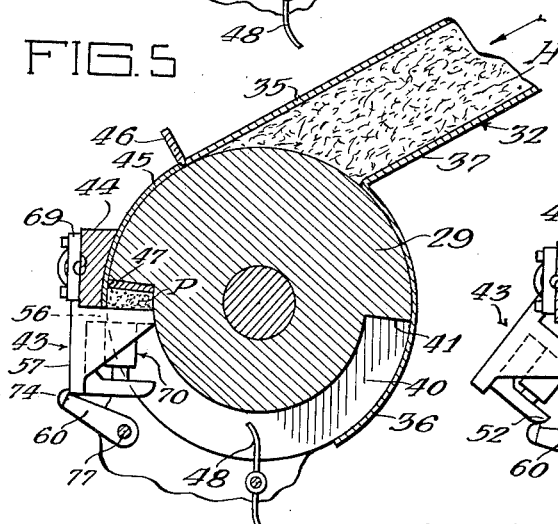
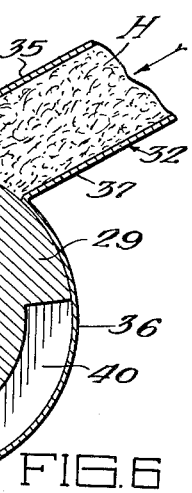
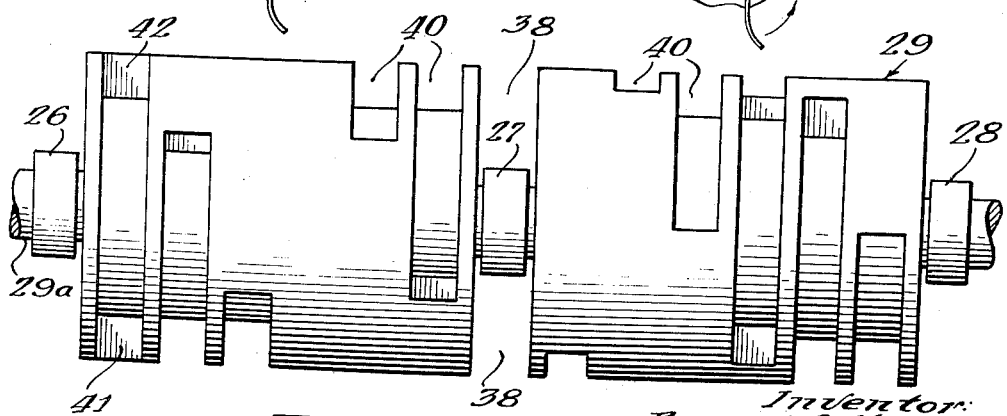

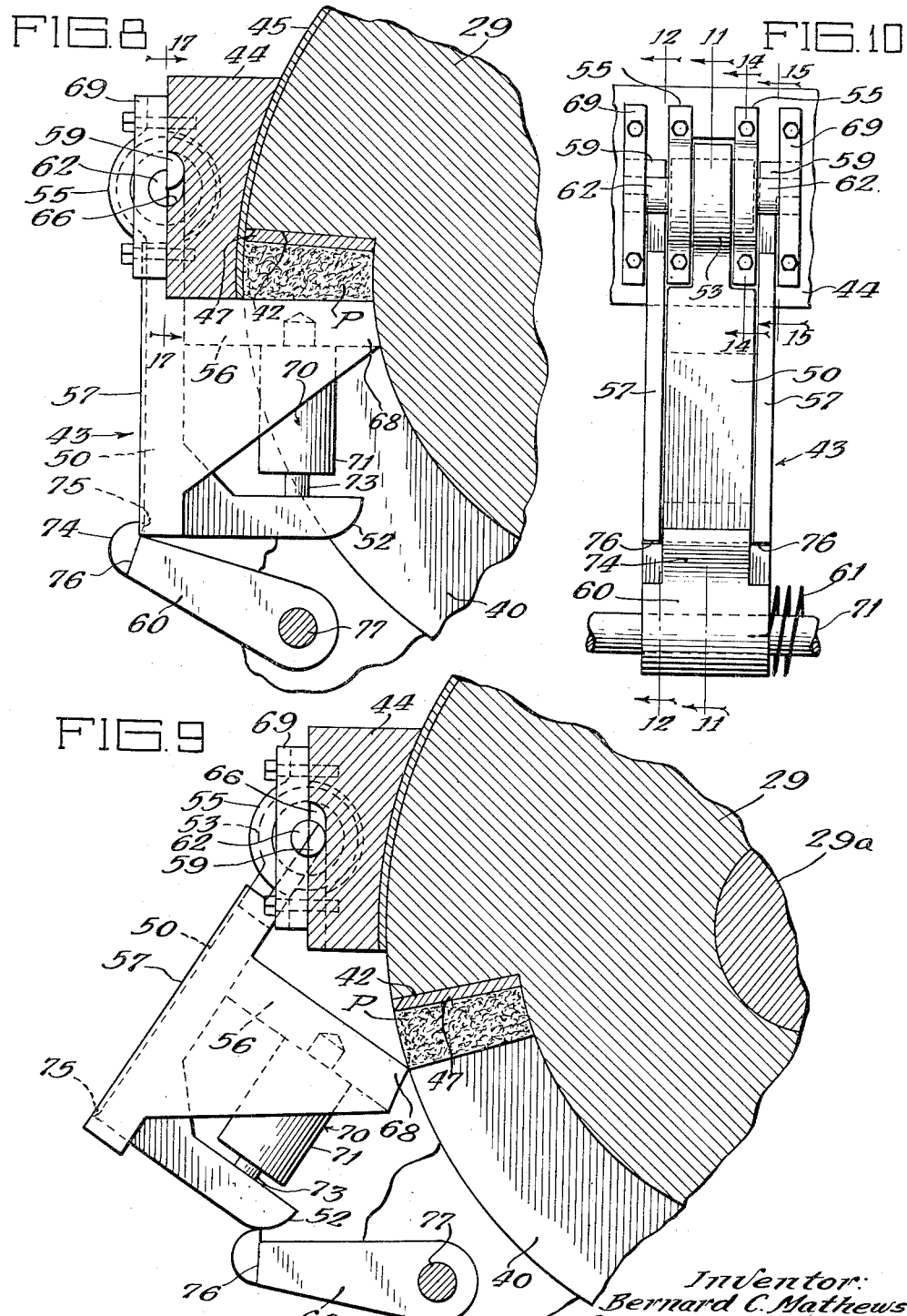

Dec. 25, 1962   B. C. MATHEWS   3,070,002
APPARATUS AND METHOD FOR PELLETIZING HAY OR THE LIKE
Filed Dec. 2, 1959   6 Sheets-Sheet 4
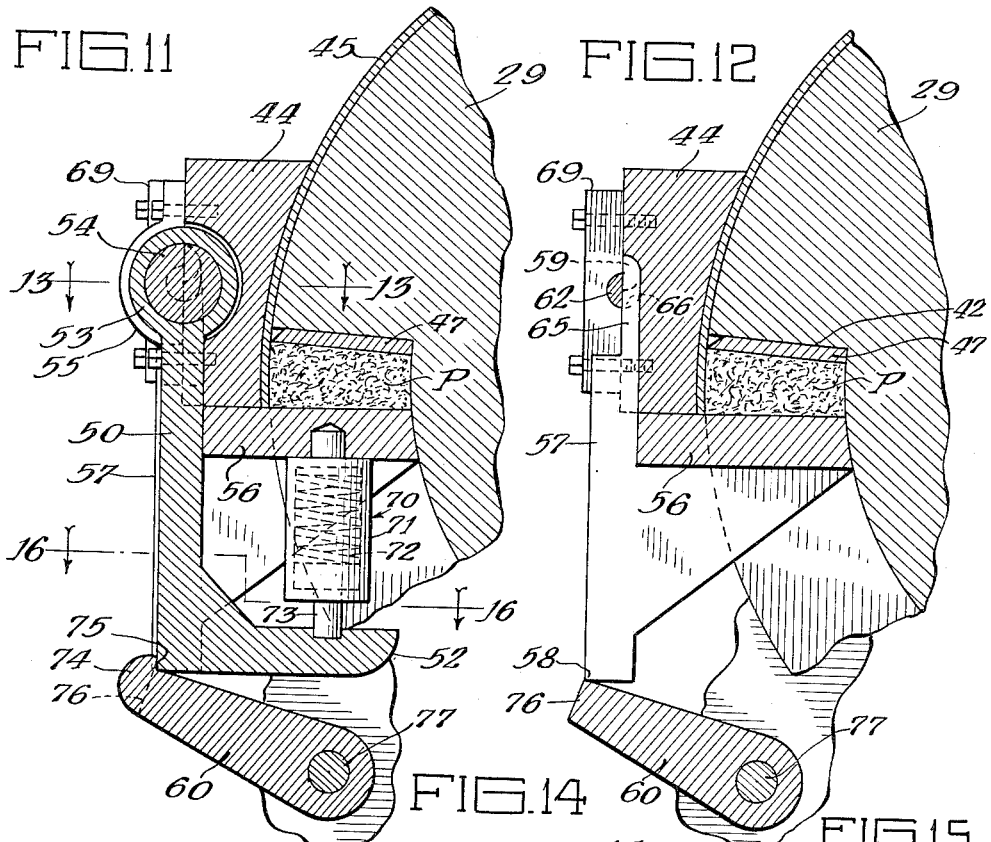
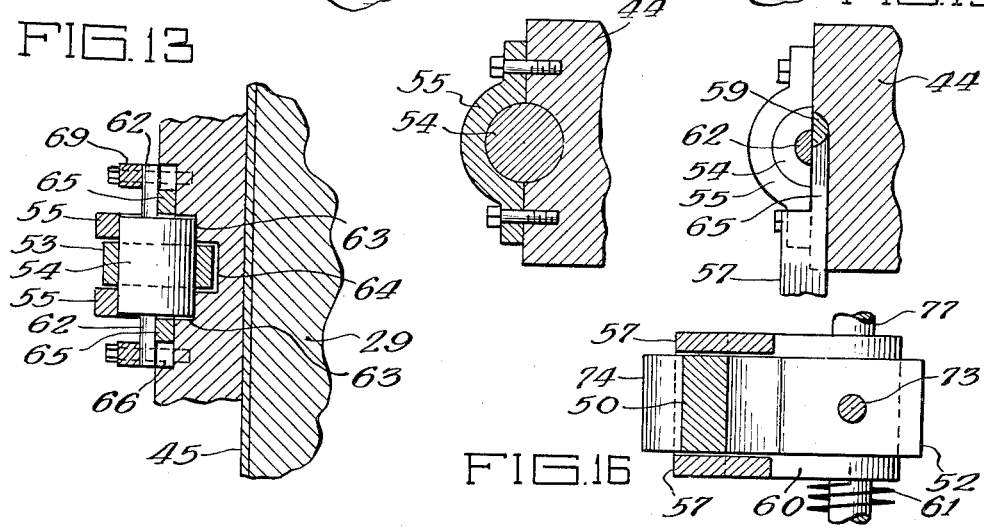
Inventor:
Bernard C. Mathews
By: Zabel, Baker, York,
Jones & Dithmar
Attorneys Dec. 25, 1962 B. C. MATHEWS 3,070,002
APPARATUS AND METHOD FOR PELLETIZING HAY OR THE LIKE
Filed Dec. 2, 1959 6 Sheets-Sheet 5

Inventor:
Bernard C. Mathews
By: Zahl, Baker, York,
Jones & Guthman
Attorneys

Dec. 25, 1962   B. C. MATHEWS   3,070,002
APPARATUS AND METHOD FOR PELLETIZING HAY OR THE LIKE
Filed Dec. 2, 1959   6 Sheets-Sheet 6

Inventor:
Bernard C. Mathews
By Zabel, Baker, York,
Jones & Dithmar
Attorneys

United States Patent Office 3,070,002
Patented Dec. 25, 1962

3,070,002
APPARATUS AND METHOD FOR PELLETIZING
HAY OR THE LIKE
Bernard C. Mathews, Box 202, Crystal Lake, Ill.
Filed Dec. 2, 1959, Ser. No. 856,761
16 Claims. (Cl. 100—35)

This invention relates to improvements in machines for forming hay or other types of forage into pellets or wafers.

It has previously been suggested that considerable economies may be effected in connection with handling and feeding by pelletizing the hay or forage. However, considerable difficulties have been encountered in providing suitable pelletizing mechanism. For instance, it has been found that a pressure of 4000 to 6000 pounds per square inch is required in order to form the pellets. This has resulted in the use of relatively heavy machinery which is not suitable for field use. Furthermore, the mechanism heretofore proposed has been in the form of a relatively heavy duty press incorporating a reciprocating ram and cylinder arrangement. As a result, it is difficult to obtain high speed operation with such reciprocating action. Furthermore, reciprocating mechanism of this type is relatively costly.

It is an object of the present invention to provide a pelletizer in which the compressing action is provided by a rotating device as contrasted with a reciprocating device.

A further object is to provide a pelletizer which, due to its comparatively light weight, is suitable for field use.

A further object is to provide a pelletizer which comprises a plurality of cyclically operating compacting couples in which the cycle of operation of each is offset from the others so as to provide a substantially constant load.

The term "compacting couple" as used herein designates generally a device in which the material is compressed and compacted between two elements such as a ram and an anvil. For instance, in the usual type of press, the bottom wall of the cylinder would be the anvil element of the couple and the movable piston would be the ram element of the couple. A compacting couple additionally includes confining walls, such as the walls of the cylinder, so as to provide a compression chamber.

According to the present invention, the compacting couple comprises a ram, which is carried on a rotor, and a retractable anvil. The rotor is provided with a groove which extends throughout a substantial portion of its periphery, such as 180°, the groove having a leading wall and a trailing wall. The trailing wall constitutes the ram. The anvil projects into the groove so that the material is compacted as the ram moves toward the anvil. The bottom and side walls of the groove constitute three of the confining walls, and a stationary guide member provides the fourth confining wall.

According to the present invention, means are provided for automatically retracting the anvil at the conclusion of the compressing operation and for repositioning it in preparation for a successive compacting operation.

It has been found that in the pelletizing of hay and similar types of forage, that the operation can be divided into a preliminary compressing operation and a compacting operation, the boundary between which is somewhat arbitrary, but which operations are characterized by a relatively small degree of force required for the compressing operation and a relatively high degree of force required for the compacting. In the pelletizing of chopped and dried hay which has been rather loosely packed into the compression chamber, it has been found that a relatively small degree of pressure is required to compress the hay to 25% of its original volume. However, a relatively high degree of pressure is required to compact the hay beyond this point; when it is reduced to substantially 11% of its original volume it has been found that the degree of compacting in the case of dried hay is sufficient to cause the hay to retain its compacted shape. Therefore, in the design of a compacting couple, approximately 85% of the work stroke of the ram is a substantially no load movement, and only about 15% of the movement represents the application of any considerable degree of force. Therefore, the use of reciprocating mechanism represents a high degree of what could be termed waste motion since 85% of the motion requires the application of a very small portion of the maximum force of which the compacting couple is capable of applying. Furthermore, in the case of a reciprocating compacting couple, the return stroke in its entirety represents waste motion.

By the use of a rotary compacting couple, the problem of return stroke is eliminated, and the inertia of the rotor is utilized advantageously in the work stroke. In other words, the kinetic energy imparted to the rotor during the compressing operation is utilized in the compacting operation.

With reference now to the drawings in which like numerals designate like parts:

FIG. 1 is a side elevation of a preferred embodiment of this invention shown in conjunction with certain associated devices, illustrating field use;

FIG. 2 is a plan view of FIG. 1;

FIG. 3 is a longitudinal vertical section through the rotor showing the construction of the compacting couple;

FIGS. 4 to 6 are views similar to FIG. 3 showing the parts in changed positions;

FIG. 7 is a transverse elevation showing the construction of the rotor;

FIG. 8 is an enlarged sectional elevation showing the retractable anvil means;

FIG. 9 is a view similar to FIG. 8 showing the parts in a changed position;

FIG. 10 is a left end view of FIG. 8, the rotor being omitted for purposes of clarity;

FIG. 11 is a vertical section taken along line 11—11 of FIG. 10;

FIG. 12 is a vertical section taken along line 12—12 of FIG. 10;

FIG. 13 is a plan section taken along line 13—13 of FIG. 11;

FIG. 14 is a vertical section taken along line 14—14 of FIG. 10;

FIG. 15 is a vertical section taken along line 15—15 of FIG. 10;

FIG. 16 is a plan section taken along line 16—16 of FIG. 11;

Figure 17:
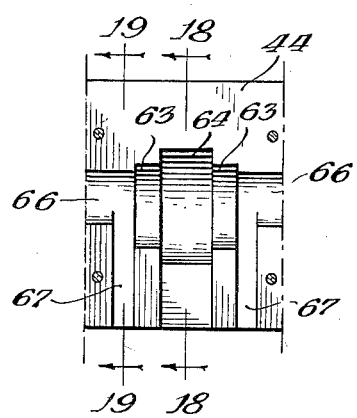
FIG. 17 is a transverse elevation of the cross member taken along line 17—17 of FIG. 8, the overlying parts being removed.
Figure 18:
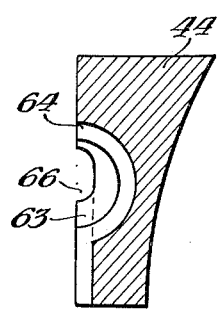
Figure 19:
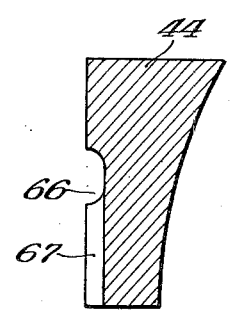
Figures 20, 21:
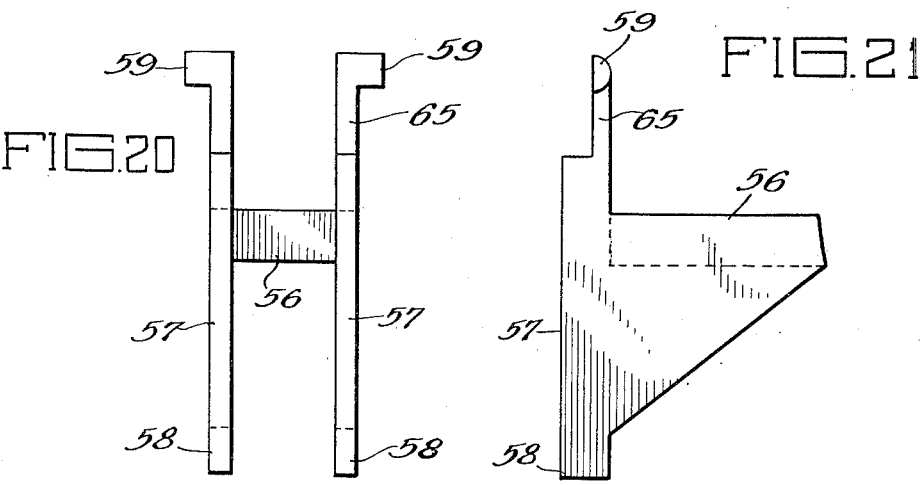
Figures 22, 23, 24, 25:
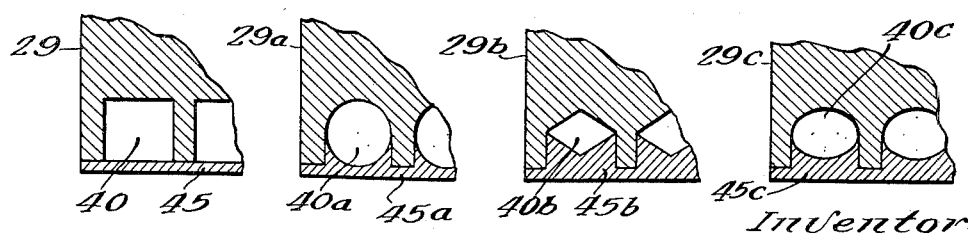
Figure 26:
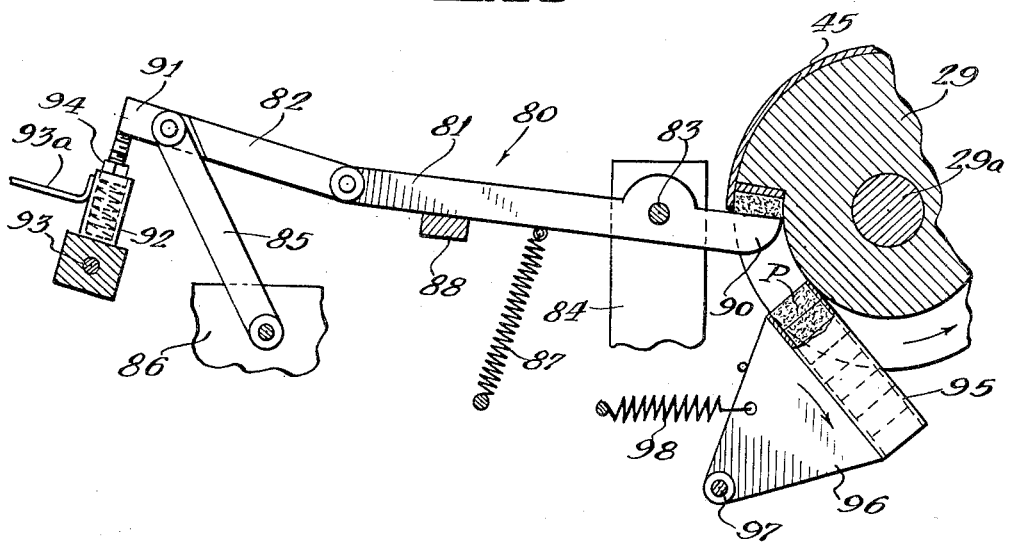
Figure 27:
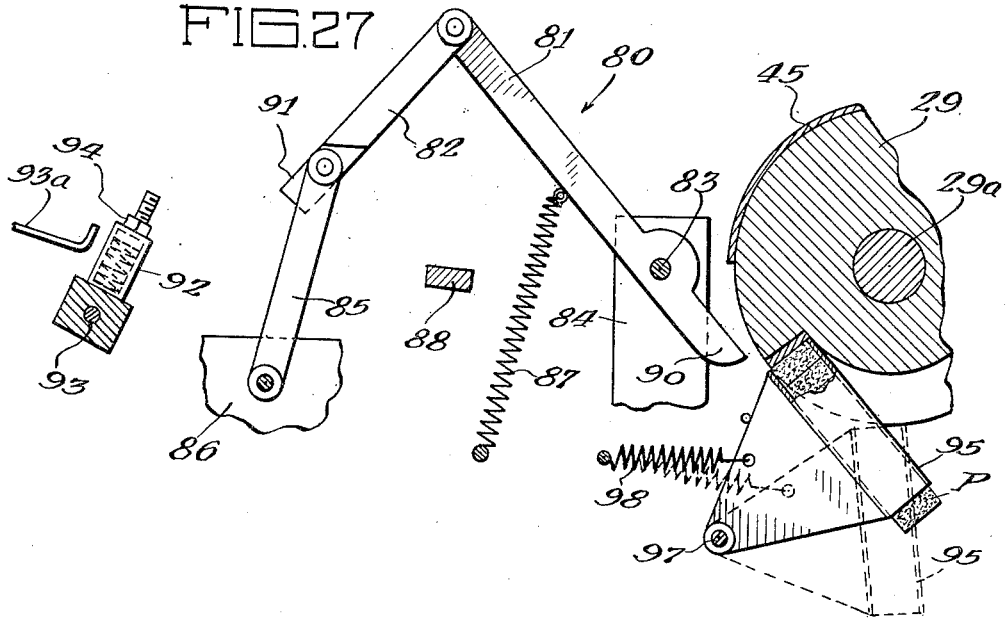

FIGS. 18 and 19 are vertical sections taken along line 18—18 and 19—19 of FIG. 17;

FIG. 20 is an elevation of the anvil member;

FIG. 21 is an end view of same;

FIG. 22 is a detailed section taken along radial line 22—22 of FIG. 4 showing the groove shape;

FIGS. 23 to 25 are views similar to FIG. 21 but showing modifications in the groove shape; and FIGS. 26 and 27 are sectional elevations showing a modification.

Referring now to FIGS. 1 and 2 the pelletizer which forms the subject matter of this invention is designated generally by the reference numeral 20. It is coupled behind a pick-up device 21, such as a chopper and hay conditioner, and the latter is coupled to a tractor 22. A wagon 23 is coupled to the pelletizer 20 to receive the pellets P discharged thereby.

FIGS. 1 and 2 illustrate the use of this invention in a hay field; the devices 21, 20 and 23 are drawn across the field by the tractor 22, and previously cut and dried hay H lying on a field is picked up by the device 21 and fed through a feed conduit 32 to the compacting couple of the pelletizer 20. The pellets P are ejected into a discharge chute 33 from which they are transported by an elevator 34 into the wagon 23. Thus, the hay is picked up, pelletized and delivered to the wagon in one continuous process as the pelletizer is drawn back and forth across the hay field.

The pelletizer comprises a suitable framework 24 which is mounted on wheels 25 as shown in FIGS. 1 and 2. Supported by the framework 24 are bearings 26, 27 and 28 shown in FIG. 7. In the bearings are journaled the trunnions 29a of the rotor 29. The rotor is a cylindrical device which may be made in two or more sections, as shown in FIG. 7, or in a single section, depending upon the width which is desired. The rotor is driven by a suitable chain and sprocket 30, shown in FIG. 1 from an engine 31 which is suitably mounted on the framework 24 and forms a part of the pelletizer.

As shown in FIG. 7, the rotor 29 is provided with a number of grooves 40 of suitable length such as 180°, which are offset angularly from each other for a purpose to be hereinafter described. Since each groove and its associated parts are substantially identical to each other, only the construction of one groove and its retractable anvil means 43 will be described herein. As shown in FIG. 3 the groove, 40 is provided with a leading wall 41, and a trailing wall 42, the latter constituting the ram of the compacting couple. The anvil of the compacting couple is a retractable anvil means 43 which includes an anvil member 56 which projects into the groove 40. The retractable anvil means is pivotally mounted on a heavy cross member 44 which is secured to the framework 24 at its ends, and at suitable intermediate points, not shown. Projecting upwardly and rearwardly from the cross member 44 is a guide wall 45 which extends upwardly to the rear edge of the upper wall 35 of the feed conduit 32. The guide wall 45 together with the bottom and side walls of the groove 40 constitute the confining walls of the compacting couple.

The feed conduit 32 is of substantially rectangular cross section, as shown in FIGS. 1 and 2, and includes a curved wall 36 which extends downwardly from the lower wall 37 of the feed conduit. The curved guide wall 45 and the curved wall 36 are preferably each continuous, extending the full width of the rotor 29. Where the rotor is made in two sections, as shown, the curved wall 46 extends forwardly over the top of the rotor so as to prevent hay from being fed into the space 38 (FIG. 7) between the two rotor sections.

Thus, hay is supplied to the surface of the rotor so that it may drop into those grooves 40 which underlie the feed conduit 32, and the arrangement is such that the distribution of the hay supplied will be more or less uniform along the full width of the rotor.

Located between the guide wall 45 and the upper wall 35 of the conduit is a stationary shear blade 46, the edge of which is substantially flush with the periphery of the rotor 29. Suitably secured to the trailing wall 42 of each groove is a ram shear blade 47 which cooperates with the stationary shear blade 46 so as to cut off or sever any particles of hay which may project beyond the ram shear blade 47, as illustrated in FIG. 4.

In operation, the pick-up device throws the hay rearwardly through the feed conduit 32 at a linear speed which is somewhat in excess of the linear speed of the periphery of the rotor 29, so that the hay tends to be packed into those grooves which at that instant underlie the feed conduit 32. As any particular groove reaches a position about midway between the FIG. 3 and FIG. 4 positions, the hay is subjected to the compressing action effected by the compacting couple which comprises the ram 42—47 and the retractable anvil means 43. From the FIG. 4 position to the FIG. 5 position, the hay is entirely confined within the confining walls of the compacting couple so that the hay contained within the groove is first compressed, and then compacted as the rotor moves from the FIG. 4 into the FIG. 5 position.

When the compacting operation has proceeded until the hay is pelletized, as represented by the position of the rotor shown in FIG. 5, the anvil means 43 is retracted into its FIG. 6 position so that the pellet P may be ejected by suitable means, such as the rotating flexible ejecting fingers 48, into the discharge chute 33. Actually, the speed of the rotor is such that the pellets are self ejecting due to centrifugal force, but the ejecting fingers 48 are provided in the event that an occasional pellet tends to stick in the groove, the ejecting fingers being driven at a substantially greater speed than the rotor speed.

The retracting mechanism for the anvil means 43 comprises a reaction member 50, a latch 60, trigger elements 58, and resilient means 70. The anvil member 56 and the reaction member are supported from the heavy cross member 44 and are pivotally mounted with respect to same. The reaction member 50 is L-shaped to provide a horizontal foot 52 which is parallel and spaced beneath the anvil 56, and the resilient member 70 urges the anvil upwardly away from the reaction member. The arrangement is such that when the compacting force exerted by the ram exceeds the force of the resilient member 70, the anvil will be displaced downwardly so that the trigger means 58 will engage the latch and cause the same to release the reaction member. When the reaction member has been released, the compacting force will cause the anvil and the reaction member to swing outwardly as a unit, thus causing retraction of the anvil and permitting continuous movement of the rotor and ejection of the pellet.

The relationship of these parts is shown in FIGS. 8 to 16.

The pivotal mounting means for the anvil and the reaction member are so designed as to permit the vertical displacement of the anvil prior to the time that the two parts swing outwardly.

With reference now to FIGS. 10 and 11, it will be observed that the L-shaped reaction member 50 includes a horizontal foot 52. The upper end of the member 50 terminates in an eye 53 which surrounds an arbor 54.

The arbor 54 is provided with end extensions 62 in the form of half rounds of considerably smaller diameter. As shown in FIGS. 13 and 17, the cross member 44 is milled out to provide two seats 63 which serve as bearings for the arbor 54, which, together with bearing caps 55 serve as bearings for the arbor 54. Thus, the arbor is secured in place by the bearing caps 55.

Between the seats 63 the cross member is milled out at 64 to accommodate the eye 53. Thus the arbor 54 and the reaction member 50 swing outwardly as a unit. Preferably the eye 53 is non-rotatably mounted on the arbor 54, as by a press fit or a suitable pin.

The anvil member 56 is provided with vertical yoke members 57, as shown in FIGS. 10 and 12, the lower portions of which constitute the trigger means 58. The upper portions of the yoke members 57 terminate in horizontally extending half trunnions 59, shown in FIGS. 13 and 15.

The cross member 44 is milled out as shown at FIGS. 17 and 15 to accommodate both the half trunnions 59 and the upper ends of the vertical yoke members 57 which at this point are reduced in thickness as indicated by the reference numeral 65.

It will be observed that the milled out portions provide a seat 66 for the half trunnions 59 as well as a vertically disposed slot 67 for the upper reduced ends 65 of the yoke members 57. However, the seat 66 instead of being semicircular, is elongated so as to accommodate the half trunnions when in their normal or elevated position. It is only when the anvil 56 is displaced, that the half trunnions seat themselves in the lower portion of the seats 66 and are concentric with the arbor 54 and its half round extensions 62 so that both the anvil and the reaction member can swing outwardly as a unit about the arbor axis.

After the assembly comprising the arbor 54, the anvil 56 and the reaction member 50 have swung outwardly, they are urged backwardly into normal position by gravity, although a spring, not shown, is preferably provided to accelerate their return into the normal position shown in FIGS. 8, 11 and 12. Of course, the periphery of the rotor 29 blocks the return movement until such time as the leading wall 41 of the groove 40 has passed beneath the corner 68 of the anvil 56, as shown in FIG. 9. As soon as the assembly has returned to its normal position, the resilient means 70 urges the anvil upwardly, and the half trunnions 59 at this time move into the upper half of the seat 66. The latch 60 is biased into operative position by a spring 61, as shown in FIG. 10 so that it will engage the reaction member as soon as the parts are returned to normal position.

The resilient member may be in the form of a telescopic housing 71, as shown in FIG. 11 in which is disposed a coil spring 72. The upper and lower portions of the housing 71 are provided with pins 73 which are received within suitable bores in the underside of the anvil 56 and in the upper surface of the horizontal foot 52 of the reaction member 50 in order to suitably maintain the resilient member in its operative position.

The latch 60 is provided with a nose portion 74 which engages a sloping surface 75 provided at the lower corner of the reaction member 50, the sloping surface serving as a detent to maintain the parts in latched position. As shown in FIGS. 10 and 12, shoulder portions 76 are provided at either side of the nose 74 which are adapted to be engaged by the trigger portions 58 in order to release the latch. The latch 60 is pivotally mounted on a shaft 77 which may be a continuous shaft extending the full width of the rotor, and which may be suitably supported at intermediate points from the cross member 44.

Thus, in operation, the assembly comprising the anvil 56, the reaction member 50, and the arbor 54, swings as a unit, and the construction is such that the major portion of the force is taken up by the cooperation of the eye 53 and the arbor which permits the use of the half trunnions 59 of relatively small diameter for supporting the anvil member 56, and which permits relative displacement of the latter with respect to the reaction member 50.

In order to provide a more uniform load on the mechanism, the several grooves 40 of each rotor section 29 may be offset from each other. In the embodiment shown, there are six grooves in each rotor section which are offset 60° from each other. This offsetting arrangement also permits a continuous removal of the hay from the feed conduit 32, since one half of the grooves will be exposed at any instant, thus avoiding the possibility of clogging due to the backing up of the hay in the feed conduit.

The groove arrangement of the second rotor section is the same as the first except that it is offset angularly from the first by an odd multiple of 30° in order to distribute the load more uniformly.

To summarize the operation which has been heretofore detailed in connection with the description of the various parts and subassemblies, hay is supplied to the grooved surface of the rotor 29 in such a manner that it will be thrown forward into any one of the several grooves 40 that may be exposed at any one time. As the trailing edge 42 moves out of the filling zone, the trailing wisps of the hay are cut off by the shear blades 46 and 47.

A volume or column of hay is thus confined by the cooperation of the walls of a groove 40 and the overlying guide wall 45, and this column of hay is initially compressed and then compacted until it occupies only a small portion of its original volume, thus forming a pellet or wafer P. The increasing resistance exerted by the compacted hay to the advance of the ram or trailing wall 42, 47 is utilized to trip the retracting mechanism for the anvil. The latter is pivotally mounted in such a way that when released, it will be responsive to a component of the force exerted by the ram so that it will move laterally out of the path thereof, so as to permit the pellet P to be ejected by centrifugal force into a suitable discharge chute 33.

The retracting mechanism is so designed as to operate with exceedingly great rapidity, and according to my invention, the resiliency of the pellet P is utilized as a shock absorber means so that the motion of the parts will be relatively smooth throughout the operating cycle.

By virtue of my invention which provides a continuously and unidirectionally operating compacting couple, a very substantial increase in compacting force per unit of weight is effected with the result that it is entirely practicable to provide a pelletizer which may be drawn across the field by a tractor as shown in FIGS. 1 and 2 and which automatically delivers the pellets to a wagon 23, thus reducing very substantially the cost of operation.

As shown in FIGS. 23 to 25, the present invention is not limited to the fabrication to pellets of rectangular cross section but they may be made in circular or any other distinctive shape by so shaping the grooves 40 and by providing a correspondingly shaped projection on the guide plates 45, the various modifications being indicated by the subscripts a, b and c.

A modified form of retractable anvil is shown in FIGS. 26 and 27 in which the anvil means forms a part of an over-center toggle 80. The toggle 80 comprises two links 81 and 82. Link 81 is rotatably mounted on a pivot 83 carried by a heavy cross member 84.

A third link 85 is pivotally mounted at one end on a second cross member 86, and the free end of the third link 85 is pivotally connected to second link 82 with the result that the second link 82 is a floating link, the linkwork being movable between the FIG. 26 and FIG. 27 positions. A suitable spring 87 biases the parts into the FIG. 26 or extended position.

The link 81 is extended beyond the pivot 83 and the extended portion comprises an anvil member 90. When the pressure excited by the ram and pellet on the anvil member exceeds a predetermined amount, the toggle will collapse, thus retracting the anvil member 80.

Suitable loading means 92 may be provided which bears on the toggle for controlling the release pressure more accurately than can be done by the spring 87. The loading means 92 may be in the form of an enclosed spring assembly similar to the resilient member 70 shown in FIG. 11 which engages an extended portion 91 of the floating link 82. In the arrangement shown, the loading means engages the underside of the extended portion 91 and hence is pivotally mounted at 93 for purposes of clearance although it could be positioned to engage the end surface of the extended portion 91 or a diagonal surface depending upon the forces involved. The arrangement shown permits the use of a less heavy spring than is required in end surface engagement.

Suitable resilient stop means are provided to limit the pivoted movement of the loading means 92 between the two positions shown, of which only one such stop means 93a is shown.

In operation, as the toggle 80 moves through its over-center position and into its extended position, the extended portion 91 will engage and compress the loading means 92. The movement of the toggle downwardly beyond the FIG. 26 position is prevented by a suitable stop 88 which engages the first link 81. It will thus be seen that when the force exerted by the ram exceeds the force exerted by the resilient loading means 92, as modified by the mechanical advantage provided by the linkwork, the toggle will be thrown over-center and into the FIG. 27 position until such time as the groove 40 is again opposite the anvil member 90. Then the bias on the toggle, due both to gravity and to the spring 87 will restore the toggle and the anvil member 90 to their extended position, ready for subsequent compacting operation.

The compacting pressure may be regulated by adjusting the tension of the resilient loading means 70 or 92, as by an adjusting nut 94 in the case of the latter.

It has been found that the pellet P will retain its shape better if it is maintained in its compressed condition for a short period of time, such as twenty seconds, immediately after the compacting operation. To this end a transfer case 95 is provided which is in the form of a thin-walled tube, the cross section of which is substantially the same as the shape of the pellet P. The transfer case is carried by a suitable bracket 96 which is pivotally mounted at 97. A spring 98 maintains the transfer case in the solid line position shown in which it will receive the pellet as it is being ejected, and the movement of the rotor 29 will cause the transfer case to be displaced out of the path of the ram. At this time, the insertion of the most recently compacted pellet will displace all of the pellets within the transfer case 95 so that the last pellet in the tube will be forced out into the discharge chute 33. In the alternative, suitable actuating means can be provided for reciprocating the transfer case in timed relationship with the rotor 29.

Although only preferred embodiments of my invention have been shown and described herein, it will be understood that various modifications and changes may be made in the constructions shown without departing from the spirit of my invention as pointed out in the appended claims.

I claim:

1. A method of pelletizing hay or the like by the use of a unidirectionally rotating compacting couple which includes a rotating ram and a retractable anvil disposed in the path of said ram, which comprises the steps of feeding the hay into said compacting couple, retracting said anvil from said ram path by utilizing the force exerted by said ram and transmitted to said anvil through the said hay which is compacted between said ram and said anvil, and utilizing the resilience of said compacted hay as a means for mitigating the shock transmitted to said anvil by said ram.

2. Apparatus for pelletizing hay or the like by the use of a compacting couple which includes a ram and an anvil comprising, in combination, means for causing the ram to move in a circular path, means for positioning the anvil in said circular path of the ram, means for feeding the hay into the space between the ram and the anvil, and means for causing movement of said anvil in the same general direction as the movement of said ram but along an arcuate path which diverges from said circular ram path in order to retract said anvil after the hay has been engaged by said ram and compacted between said compacting couple to a predetermined extent, whereby said ram can be caused to move unidirectionally and at a substantially constant rate of speed.

3. A compacting couple for use in pelletizing hay or the like comprising a rotor having a groove extending throughout a substantial portion of its peripheral surface, said groove providing a trailing wall, a bottom wall, and two side walls, a retractable anvil mounted for movement between an operative position in which it extends into said groove and an inoperative position in which it is disposed outside of said groove and will clear said trailing wall, said trailing wall constituting the ram of a compacting couple, and a guide wall overlying said groove and extending away from said anvil when in its operative position, whereby a volume of hay fed into said groove and confined therein between the walls thereof and said guide wall will be compacted between said ram and said anvil to form a pellet.

4. A pelletizer for use in compressing and compacting hay or the like comprising a rotor having a groove extending throughout a substantial portion of its peripheral surface, means for driving said rotor, a retractable anvil mounted for movement between an operative position in which it extends into said groove and an inoperative position in which it is disposed outside of said groove and will clear said rotor, a guide wall overlying that portion of the periphery of said rotor which is in advance of said anvil when in its operative position, whereby a volume of hay fed into said groove and confined therein by said guide wall will be compacted against said anvil to form a pellet, means responsive to the pressure exerted on said pellet for retracting said anvil, and a feed conduit overlying a portion of said rotor and located so that it will register with said groove at a point angularly offset from said anvil, said guide wall extending from said feed conduit to said anvil.

5. A pelletizer as claimed in claim 4 having a stationary shear blade located between said guide wall and said feed conduit and having an edge which is substantially flush with the periphery of said rotor, and a movable shear blade mounted on said rotor at the trailing end of said groove, and having an edge which is substantially flush with the periphery of said rotor, and which cooperates with the edge of stationary shear blade to cut off particles of hay which may extend rearwardly out of said groove and into said feed conduit to avoid entrapment of hay between the periphery of said rotor and said guide wall.

6. A pelletizer for use in compressing and compacting dry hay or the like comprising a rotor having a groove extending throughout a substantial portion of its peripheral surface, means for driving said rotor, a retractable anvil mounted for movement between an operative position in which it extends into said groove and an inoperative position in which it is disposed outside of said groove and will clear said rotor, a guide wall overlying a portion of the periphery of said rotor to form a closure for said groove, a feed conduit overlying another portion of the periphery of said rotor and located so that it will register with said groove at a point angularly offset from said anvil, and means associated with said feed conduit for advancing hay therethrough at a linear speed which is greater than the linear speed of the periphery of the rotor so that said hay will be supplied to said groove when said groove underlies said feed conduit.

7. A pelletizer for use in compressing and compacting dry hay or the like comprising a rotor having a groove extending throughout a substantial portion of its peripheral surface, means for driving said rotor, a retractable anvil mounted for movement between an operative position in which it extends into said groove and an inoperative position in which it is disposed outside of said groove and will clear said rotor, a guide wall overlying that portion of the periphery of said rotor which is in advance of said anvil when in its operative position, whereby a volume of hay fed into said groove and confined therein by said guide wall will be compacted against said anvil to form a pellet, means responsive to the pressure exerted on said pellet for retracting said anvil, and ejecting means for removing said pellet from said groove after the retraction of said anvil.

8. A pelletizer as claimed in claim 7 in which said ejecting means comprises a rotatably mounted finger located adjacent to said rotor and extending into said groove, and means for rotating said finger in the same angular direction as that in which said rotor rotates and at a substantially greater speed, said finger being flexible so that it will be displaced backwardly when engaged by the periphery of said rotor and so that the continued rotation of said finger will not be obstructed.

9. A pelletizer for use in compressing and compacting dry hay or the like comprising a rotor having a groove extending throughout a substantial portion of its peripheral surface and providing a ram at its trailing end, means for driving said rotor, a retractable anvil mounted for movement between an operative position in which it extends into said groove and an inoperative position in which it is disposed outside of said groove and will clear said rotor, a guide wall overlying that portion of the periphery of said rotor which is in advance of said anvil when in its operative position, whereby a volume of hay fed into said groove and confined therein by said guide wall will be compacted against said anvil to form a pellet, means responsive to the pressure exerted by said ram on said pellet for retracting said anvil, a transfer case located adjacent to said rotor and beyond said anvil, and means for mounting same for rotation between an extended position in which it extends into said groove and a retracted position in which it clears said rotor, said transfer case comprising a tubular member having a cross section corresponding to the cross section of said groove, whereby said ram, after the retraction of said anvil, will force successive pellets into one end of said transfer case, and cause the last pellet in said transfer case to be ejected therefrom through the opposite end.

10. A pelletizer comprising a rotor having a plurality of grooves formed in the surface thereof and extending throughout a substantial portion of its cylindrical surface, the trailing wall of each of said grooves constituting the ram of a compacting couple, a plurality of retractable anvils, each one being mounted adjacent to the surface of said rotor for movement between an operative position in which it extends into one of said grooves and an inoperative position in which it is disposed outside of said groove and will clear said trailing wall, whereby each anvil cooperates with the ram of its respective groove to provide a compacting couple for pelletizing hay disposed in each of said grooves, and means overlying each of said grooves to confine said hay within said groove during said compacting operation, said grooves being angularly offset from each other in order to distribute the load on said rotor substantially uniformly throughout each revolution of said rotor.

11. A compacting couple for use in pelletizing hay or the like comprising a rotor having a groove extending throughout a substantial portion of its peripheral surface, said groove providing a trailing wall, a bottom wall, and two side walls, retractable anvil means mounted for movement between an operative position in which it extends into said groove and an inoperative position in which it is disposed outside of said groove and will clear said trailing wall, said trailing wall constituting the ram of a compacting couple, a guide wall overlying said groove and extending away from said anvil means when in its operative position, a feed conduit abutting a portion of said rotor for supplying the material to be compacted to said groove, said guide wall and said groove walls constituting the confining walls of said compacting couple, and means responsive to the pressure exerted by said compacting couple upon said material for retracting said anvil means.

12. A compacting couple for use in pelletizing hay or the like comprising a rotor having a groove extending throughout a substantial portion of its peripheral surface, said groove providing a trailing wall, a bottom wall, and two side walls, retractable anvil means mounted for movement between an operative position in which it extends into said groove and an inoperative position in which it is disposed outside of said groove and will clear said trailing wall, said trailing wall constituting the ram of a compacting couple, a guide wall overlying said groove and extending away from said anvil means when in its operative position, said guide wall and said groove walls constituting the confining walls of said compacting couple, said retractable anvil means comprising an anvil member mounted for pivotal movement into and out of said operative position, and means for releasably locking said anvil member in its operative position, said locking means including resilient loading means which permits yielding movement of said anvil member in response to a predetermined degree of pressure, said locking means being responsive to said yielding movement to effect the release thereof.

13. A compacting couple for use in pelletizing hay or the like comprising a rotor having a groove extending throughout a substantial portion of its peripheral surface, said groove providing a trailing wall, a bottom wall, and two side walls, retractable anvil means mounted for movement between an operative position in which it extends into said groove and an inoperative position in which it is disposed outside of said groove and will clear said trailing wall, said trailing wall constituting the ram of a compacting couple, and a guide wall overlying said groove and extending away from said anvil means when in its operative position, said guide wall and said groove walls constituting the confining walls of said compacting couple, and said retractable anvil means comprising an anvil member and a reaction member mounted for pivotal movement in and out of said operative position, resilient means urging said anvil member and said reaction member away from each other, latch means engaging said anvil means for maintaining same in said operative position, and means responsive to the movement of said anvil member toward said reaction member for releasing said latch means.

14. A compacting couple as claimed in claim 13 which also includes a cross member disposed in front of said rotor and above said retractable anvil means, and an arbor mounted on said cross member, and in which said anvil member is provided with an eye which surrounds said arbor, whereby the major portion of the force exerted by said ram on said anvil member will be taken up by said reaction member and said arbor, said reaction member being non-rotatably mounted with respect to said arbor and said arbor being rotatably mounted with respect to said cross member, said arbor having at either end half trunnions of a smaller diameter, and said anvil member being provided with yoke members terminating in horizontally extending half trunnions which complement the half trunnions on said rotatably mounted arbor when said anvil member has been displaced toward said reaction member into latch released position.

15. A compacting couple for use in pelletizing dry hay or the like comprising a rotor having a groove extending throughout a substantial portion of its peripheral surface, said groove providing a trailing wall, a bottom wall, and two side walls, retractable anvil means mounted for movement between an operative position in which it extends into said groove and an inoperative position in which it is disposed outside of said groove and will clear said trailing wall, said trailing wall constituting the ram of a compacting couple, and a guide wall overlying said groove and extending away from said anvil means when in its operative position, said guide wall and said groove walls constituting the confining walls of said compacting couple, said retractable anvil means comprising over-center toggle means including a fixed pivot link and a floating link, means for movably supporting the remote end of said floating link to permit movement of said toggle between an extended position and a collapsed position, said toggle being biased into its extended position, said fixed pivot link being extended beyond said pivot to provide an anvil member which extends into said groove when said toggle is in its extended position whereby the collapse of said toggle means will cause retraction of said anvil member from said groove.

16. A compacting couple as claimed in claim 15 in which said remote end supporting means comprising a third link mounted at one end on a fixed pivot, the free end thereof being connected to said floating link, and resilient loading means mounted for engagement by said floating link when said toggle means moves through its over-center position and into its extended position.

References Cited in the file of this patent

UNITED STATES PATENTS

| | | |
|---|---|---|
| 2,189,831 | Paynter et al. | Feb, 13, 1940 |
| 2,934,198 | Schonrock | Apr. 26, 1960 |